Aug. 4, 1970  A. WELLS  3,522,949
ANNULAR SEALING MEANS
Filed Aug. 8, 1966  5 Sheets-Sheet 5

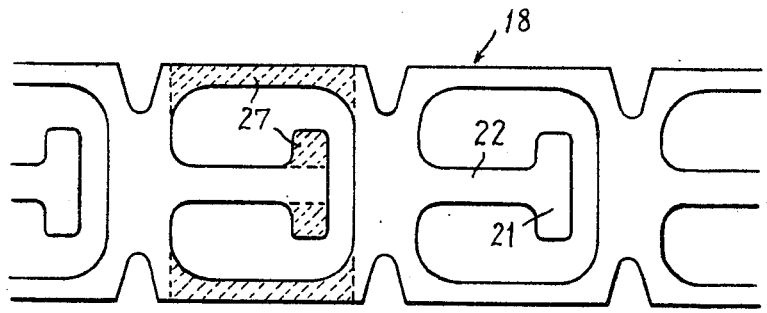
Fig.10
Fig.14
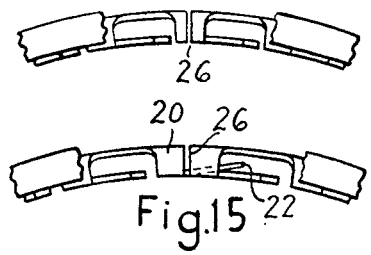
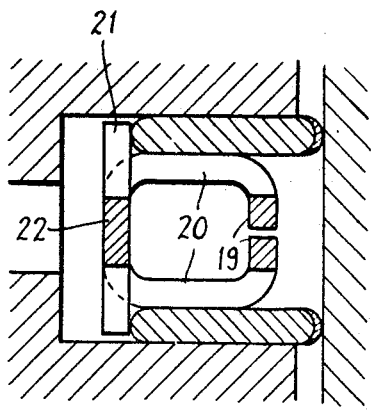
Fig.12
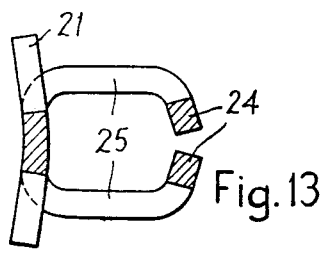
Fig.13
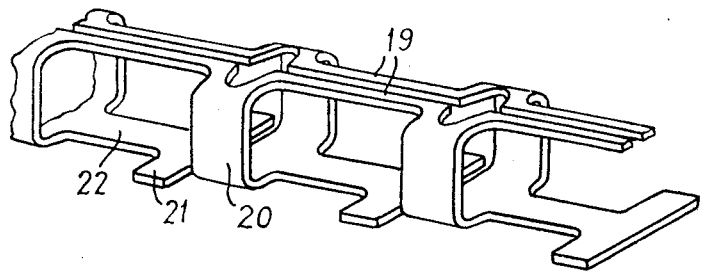
Fig.11

Inventor
ALAN WELLS
By
Holcombe, Wasserott + Bruebois
Attorneys

United States Patent Office 3,522,949
Patented Aug. 4, 1970

3,522,949
ANNULAR SEALING MEANS
Alan Wells, Bradford, England, assignor to Hepworth & Grandage Limited, Bradford, England, a British company
Continuation-in-part of application Ser. No. 445,654, Apr. 5, 1965. This application Aug. 8, 1966, Ser. No. 571,118
Claims priority, application Great Britain, Apr. 8, 1964, 14,584/64
Int. Cl. F02f 5/00; F16j 9/06
U.S. Cl. 277—140        4 Claims

ABSTRACT OF THE DISCLOSURE

The disclosure relates to annular sealing means having a split sealing ring and a split spacer element, adapted to be assembled and located in an annular groove in one of a pair of relatively movable generally circular-section co-axial members to form a seal, with the spacer element having its free split ends in abutment so as to be virtually circumferentially incompressible without bottoming in the groove. The sealing means includes a plurality of springs integral with the spacer element and operable independently of each other to engage the sealing ring and urge the latter into engagement with a surface with which it is to cooperate.

---

This application is a continuation-in-part of my application Ser. No. 445,654, filed Apr. 5, 1965.

The present invention relates to annular sealing means for sealing two relatively reciprocable, generally circular-section, coaxial members. More particularly, the invention relates to a composite piston ring for internal combustion engines, compressors or the like, for example, a three piece ring comprising two split steel rails or sealing rings, and a resilient steel spacer element. The spacer element serves the dual purpose of axially spacing the two sealing rings apart, and of applying a radially outward pressure to the rings to urge them against the surface of a cylinder bore with which they cooperate.

It has previously been proposed to employ a spacer element int he form of a circumferentially-expandable, axially split ring, known as a spacer-expander spring, the adjacent ends of which are normally spaced apart, but which abut when the spring is compressed during use. Such a spacer element relies for its circumferential expansion or reslience, when its ends are in abutment, upon the deflection of a series of small interconnected elements, analogous to a compression spring.

This type of spacer element has the disadvantage that it is only as efficient as the weakest of the interconnected elements, and collapse of one or more of the latter elements result in failure of the spacer element, and therefore of the composite ring as a whole.

Moreover, since the radially outward pressure applied to the rails or sealings by the spacer element is entirely dependent upon the circumferential expansion of the spacer element, the spring rate of the latter must be designed to give a limited deflection, otherwise assembly of the composite ring into a cylinder bore is made difficult. In order to compensate for cylinder bore and/or ring wear, it is desirable to have the maximum possible deflection of the spacer element, but due to the previously mentioned assembly difficulty a compromise has to be made in the design of all composite ring assemblies of this type. The design of composite ring is also frequently impeded in its performance by the build up of friction between those portions of the spacer element which transfer the outward pressure to the rails and the radially inner edges of the rails engaged by these portions.

It is an object of the present invention to provide annular sealing means, such as a composite piston ring, which avoids these disadvantages.

To this end, the present invention consists in annular sealing means comprising a sealing ring, a spacer element, and a plurality of springs, particularly leaf or cantilever springs, integral with the spacer element and operable independently of each other to engage the sealing ring and urge the latter into engagement with a surface with which it is to cooperate. Preferably, at least two sealing rings are provided, spaced apart axially by the spacer member and engaged by the springs.

In order that the invention may be more readily understood, reference will now be made to the accompanying drawings, in which:

FIG. 1 is a plan view of part of a spacer element blank, according to one embodiment of the invention, FIG. 2 is a perspective view of part of a spacer element formed from the blank shown in FIG. 1.

FIG. 3 is a transverse section of a composite piston ring incorporating the spacer element shown in FIG. 2, and assembled within a piston ring groove of a piston reciprocable in a cylinder bore of an internal combustion engine, FIG. 4 is a plan view, partly in section, of part of the composite piston ring shown in FIG. 3, FIG. 5 is a perspective view of part of a spacer element according to a second embodiment of the invention, FIG. 6 is a perspective view of a part of a spacer element according to a third embodiment of the invention, FIG. 7 is a plan view of part of a spacer element blank, according to a fourth embodiment of the invention;

FIG. 10 is a plan view of part of a spacer element blank according to a fifth embodiment of the invention, FIG. 11 is a perspective view of part of a spacer element formed from the blank shown in FIG. 10.

FIG. 12 is a transverse section, similar to FIGS. 3 and 9, of a composite piston ring incorporating the spacer element of FIG. 11.

FIG. 13 is a transverse section of a spacer element according to a sixth embodiment of the invention, FIGS. 14 and 15 are plan views, partly in section, of the composite rings shown in FIGS. 9 or 12.

Figure 1:
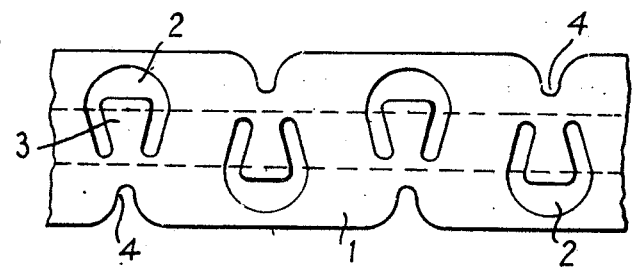
Figure 2:
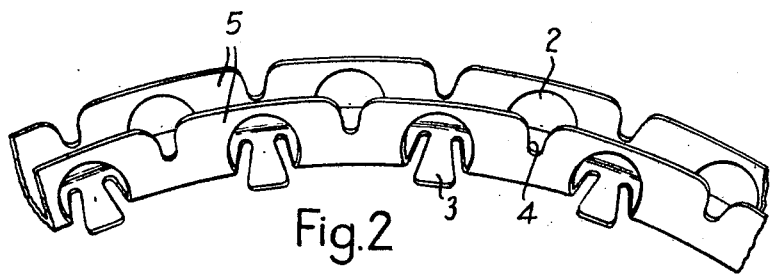

Referring to FIG. 1, the spacer element blank is formed, for example, from spring steel strip 1, punched or otherwise formed with a plurality of alternate oppositely facing U-shaped slots 2 so as to provide integral tongues 3, which constitute leaf springs in the final spacer element, and with cut-outs 4 in opposite side edges of the strip 1. This blank is folded along the two broken lines into a channel section as shown in FIG. 2 having two flanges 5, and this channel section is then formed into a ring of predetermined peripheral length.

Figure 4:
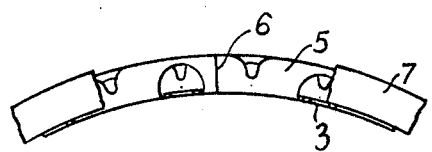

The cut-outs 4 in the edges of the flanges 5 compensate for the material removed from around the tongue 3, to assist in the formation of a balanced or regular ring. The ends of the ring normally abut one another as shown at 6 in FIG. 4, to provide a virtually solid, circumferentially incompressible ring. The tongues 3 are so dimensioned that the free ends thereof project axially of the flanges 5 of the channel section and are disposed radially inwardly of the flanges 5.

Figure 3:
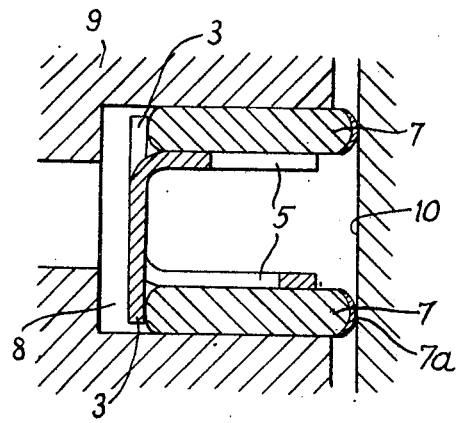

As shown in FIG. 3, the spacer element or spacer-expander spring constitutes part of a composite piston ring which also includes a pair of split sealing rings or rails 7 which are positioned on the flanges 5 in axially spaced relationship. The rails 7 may be made from steel strip formed into a circle, the radially outer peripheral faces thereof being preferably coated with a wear-resistant material 7a for example, molybdenum or chromium. The radially inwardly facing edges of rails 7 engage the axially outer ends of the tongues 3.

In operation, the composite piston ring is confined in a groove 8 in a piston 9 reciprocable within a cylinder bore 10 of an internal combustion engine, the spacer element having its ends in abutment and being spaced from the base of the groove. The tongues 3 constitute cantilever or leaf springs which are adjusted to the spacer element and are individually deflected radially inwards by the radially inner edges of the rails 7 by a predetermined amount, the deflection being accommodated by flexing of the tongues 3 along their axial length. Consequently these springs exert a radial outward pressure on the rails 7 to expand them into sealing engagement with the cylinder bore 10.

Figure 5:
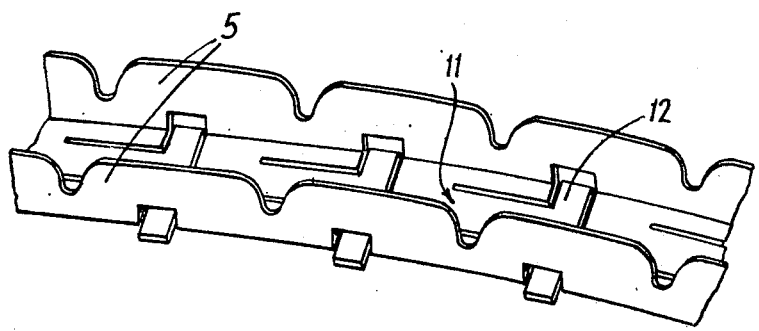

The spacer element shown in FIG. 5 is provided with a plurality of T-shaped leaf springs or tongues 11 which flex along their circumferential length instead of along their axial length. The cross-limb 12 of each tongue 11 unprojects axially beyond both flanges 5 of the channel section and engages with the radially inner edges of both rails (not shown) to provide the required outward pressure.

Figure 6:
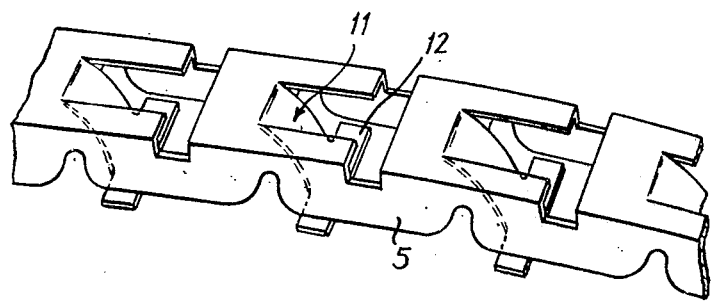

In the embodiments shown in FIGS. 1 to 5, the base of the channel section with which the tongues or leaf springs are integrally formed, is disposed radially inwards of the flanges 5. In the embodiment shown in FIG. 6, however, the tongues 11 are bent or displaced in such a manner that when the blank strip is folded into a channel section, the axial ends of the cross limbs 12 are disposed against the side edges of the rail-supporting flanges 5. The channel section is subsequently formed into a ring with the base of the channel section disposed radially outwardly of the flanges 5.

Figure 7:
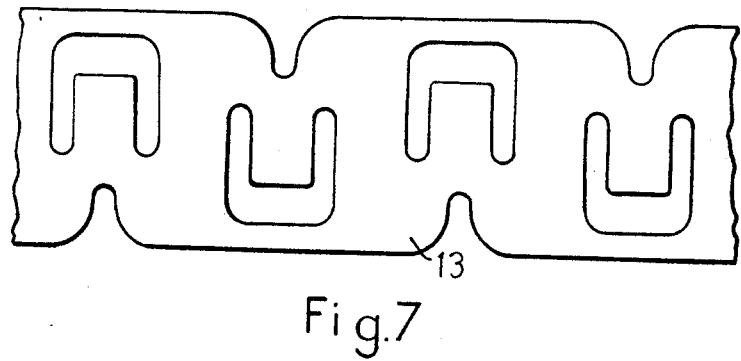
Figure 9:
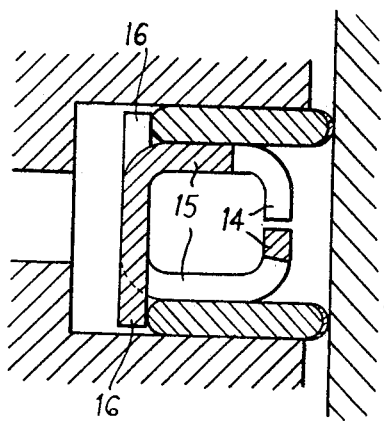
FIG. 9 is a transverse section, similar to FIG. 3, of a composite piston ring incorporating the spacer element shown in FIG. 8.
Figure 8:
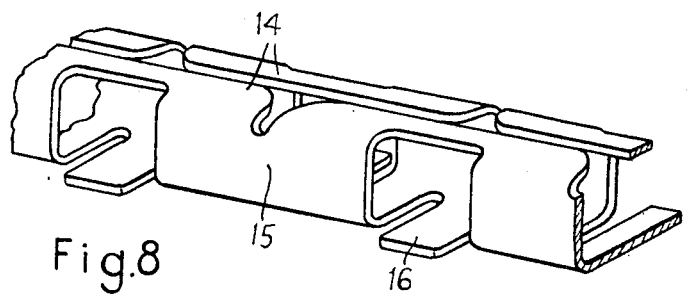
FIG. 8 is a perspective view of part of a spacer element formed from the blank shown in FIG. 7.

The spacer element illustrated in FIGS. 7, 8 and 9 differs from that illustrated in FIGS. 1 to 3 in that the blank 13 (FIG. 7) is wider in relation to its length than is the blank 1 (FIG. 1), and this blank 13 is folded longitudinally along four lines into a rectangular section as shown in FIGS. 8 and 9, with its two edges 14 disposed adjacent one another. This rectangular section is then formed into a split ring with the sides or flanges 15 extending radially to provide rail-supporting surfaces, and with the tongues 16 projecting alternately axially beyond these flanges 15.

This element is assembled in a piston ring groove 17 as shown in FIG. 9, and operates in the same manner as described with reference to FIG. 3.

Likewise, the spacer element illustrated in FIGS. 10, 11 and 12, differs from that illustrated in FIG. 5 in that the blank 18 is folded along four lines into a substantially closed box or rectangular section with its two edges 19 disposed adjacent one another, instead of into a radially opening U. This section is then formed into a split ring with the sides or flanges 20 extending radially to provide rail-supporting surfaces, and with the cross-limbs 21 of the tongues 22 projecting axially beyond both flanges 20.

This element is assembled in a piston ring groove 23 as shown in FIG. 12, and operates in the same manner as described with reference to FIG. 5.

In the embodiments illustrated in FIGS. 7 to 12, the spacer elements are of substantially box section, the folds being such that adjacent faces are disposed approximately at 90° relative to each other. However, as shown in FIG. 13, the edge portions 24 of the element may be folded to an angle greater than 90°, and, although not shown, the rail-supporting flanges 25 may converge or diverge, instead of being mutually parallel. In addition, as shown, the cross-limbs 21 may be angled instead of straight.

The free ends of the spacer elements illustrated in FIGS. 7 to 13 abut when the composite rings incorporating them are in operation. This may be achieved, as shown in FIG. 14, by cutting the spacer element through the box section to provide plain ends 26 which simply abut. Alternatively, as shown in FIG. 15, a tongue 22 may be left at one end of the element, by cutting out the portions 27 shown shaded in FIG. 10, the tongue 22 being inserted into the other end 26 of the element, which is of plain box section. The tongue 22 may be folded or cranked to take up the whole of the space available in the box section of the plain end to prevent or restrict relative radial movement between the two ends.

The spacer elements hereinbefore described have the advantage that failure of any one tongue or spring will have only a proportionate effect on the performance of the composite ring as a whole since the spacer element will not collapse and the operation of the remaining tongues or springs will not be effected. Since the free ends of the spacer element abut, the element is virtually incompressible, and the dimensions of the spacer element do not effect the deflection or spring rate of the tongues or springs.

Each cantilever spring is designed to give optimum deflection, but since the length of the spacer element is unaffected by the spring rate or deflection, assembly of the composite ring is readily achieved by merely compressing the rails. The deflection of the springs is, furthermore, generally independent of both the ring groove depth and of the deflection of spacer element.

Moreover, circumferential friction between the spacer element and rails is substantially eliminated.

The spacer elements illustrated in FIGS. 7 to 9 and 10 to 12 have certain additional advantages. By virtue of the fact that these spacer elements, when viewed in cross-section, have a box or rectangular form, produced by extending and folding over the radial extremities 14 (FIG. 9) and 19 (FIG. 12) of the flanges 15 and 20 respectively, instead of having a U-shaped cross-section as illustrated in FIGS. 1 to 6, improved axial support is provided for the rails. Moreover, if desired, a lighter section material may be used for the spacer element without danger of axial collapse of the latter and/or, as will be clearly seen from FIG. 11, the element may be relieved or cut away. In addition, the abutting ends of the elements are radially locked or located so that overlapping of these ends is avoided, which would detrimentally affect the performance of the composition ring incorporating the element.

It will be understood that various modifications may be made without departing from the scope of the present invention. For example, the spacer elements may, in cross-section, have configurations other than those specifically illustrated. In this respect, the elements illustrated in FIGS. 7 to 13 may have the configuration of a closed, or substantially closed figure, other than a box-like or rectangular configuration.

Figure 16:
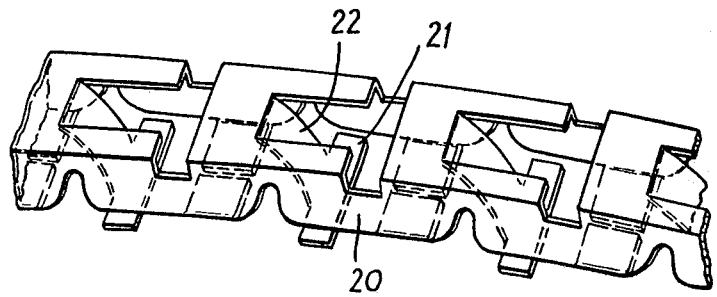
FIG. 16 is a perspective view of yet another embodiment of the invention, similar to the one illustrated in FIG. 6.

The tongues or springs may take various forms in addition to those hereinbefore described. In this respect, in the embodiments shown in FIGS. 7 to 13, the face of the rectangular section with which the tongues or leaf springs are integrally formed, is disposed radially inwards of the flanges 20. However, as shown in FIG. 16, the tongues or leaf springs may be bent or displaced in such a manner that when the blank strip is folded into a tubular section which is formed into a ring with the said face of the flanges 20, the axially projecting ends of the tongues or leaf springs are disposed radially inwardly of the flanges 20 against the longitudinal adjacent edges of the element, in a similar manner to that illustrated in FIG. 6.

The spacer element may be inwardly springing, so that its free ends are normally urged into abutment, it may be formed so that the free ends are normally just touching, or slightly spaced apart, or alternatively the spacer element may be outwardly springing, in which case the free ends may or may not abut when the composite ring is in its operational position. In the case of an outwardly springing spacer element, the resilience of the tongues should be such that rails will compress the spacer element through the tongues until its free ends abut before the tongues themselves deflect.

The wear-resistant material may be omitted from the periphery of the rails, or additionally or alternatively, the inner faces thereof may be coated by a wear-resistant material.

The invention although described with reference to piston rings, may be applied to other annular seals provided between relatively reciprocable or rotatable members. In this respect the rails or sealing rings may be inwardly instead of outwardly springing so as to seal around a shaft or the like surrounded by the sealing means.

The rail-supporting flanges 5 of the spacer element may, if desired, be arranged to resiliently urge the rails located thereon into engagement with the sides of the piston ring groove, or alternatively these sides may merely support the rails. Although it is preferred to employ a pair of rails, it is possible to use the spacer element with a single rail, or alternatively to locate two or more rails on one or both flanges of the spacer element.

I claim:

1. Composite annular sealing means comprising a pair of split sealing rings and a split spacer element adapted to be assembled together and to be located in an annular groove in one of a pair of relatively-movable generally-circular-section coaxial members to form a seal therebetween, said split spacer element
    (a) having its free ends in abutment so as to be virtually circumferentially incompressible without bottoming in the groove,
    (b) comprising a strip of sheet metal bent longitudinally into a circumferentially-extending ring and folded transversely to form, at least at a multiplicity of regions around its circumference, a substantially closed box section with the two edges of said strip disposed adjacent one another,
    (c) said strip of sheet metal having, at least at each of said multiplicity of regions, two axially-spaced limbs which constitute flanges for the abutment of said split sealing rings, whereby to locate said split sealing rings in axially-spaced relationship, and having portions interconnecting said axially-spaced limbs, and
    (d) said strip of sheet metal having integral therewith a plurality of springs, each said spring being cantilevered from a said portion and comprising a circumferentially-extending tongue formed with a cross limb, said cross limb projecting in each direction axially beyond said axially-spaced limbs to engage said split sealing rings and urge them into engagement with the other of said pair of relatively-movable members.

2. Composite annular sealing means as claimed in claim 1 wherein said two edges are disposed radially outwards of said axially-spaced limbs, and said portions interconnecting said limbs are disposed radially-inwards of said limbs.

3. Composite annular sealing means as claimed in claim 1 wherein said two edges are disposed radially-inwards of said axially-spaced limbs, and said portion interconnecting said limbs is disposed radially outwards of said limbs.

4. Composite annular sealing means comprising a pair of split sealing rings and a split spacer element adapted to be assembled together and to be located in an annular groove in one of a pair of relatively-movable generally-circular-section coaxial members to form a seal therebetween, said split spacer element
    (a) having its free ends in abutment so as to be virtually circumferentially incompressible without bottoming in the groove,
    (b) comprising a strip of sheet metal bent longitudinally into a circumferentially-extending ring and folded transversely to form, at least at a multiplicity of regions around its circumference, a substantially closed box section with the two edges of said strip disposed adjacent one another,
    (c) said strip of sheet metal having, at least at each of said multiplicity of regions, two axially-spaced limbs which constitute flanges for the abutment of said split sealing rings, whereby to locate said split sealing rings in axially-spaced relationship, and having portions interconnecting said axially-spaced limbs, and
    (d) said strip of sheet metal having integral therewith a plurality of springs, each said spring comprising a cantilever leaf spring which extends in a generally circumferential direction and is flexible along its circumferentially-extending length, said cantilever leaf spring being generally T-shaped and being disposed with its cross limb projecting axially beyond both said flanges to engage the radially-inner edges of both said sealing rings.

References Cited

UNITED STATES PATENTS

| | | |
|---|---|---|
| 2,817,564 | 12/1957 | Marien. |
| 2,833,605 | 5/1958 | Shirk. |
| 2,837,385 | 6/1958 | Mayfield. |
| 2,886,384 | 5/1959 | Hamm. |
| 2,999,728 | 9/1961 | Estey. |
| 3,081,100 | 3/1963 | Nisper. |
| 3,181,875 | 5/1965 | Shepard _____ 277—140 |
| 3,190,662 | 6/1965 | Mayfield _____ 277—140 |

LAVERNE D. GEIGER, Primary Examiner

J. S. MEDNICK, Assistant Examiner

U.S. Cl. X.R.

277—141, 149; 267—1.5